(12) United States Patent
Kim et al.

(10) Patent No.: US 8,698,170 B2
(45) Date of Patent: Apr. 15, 2014

(54) DISPLAY DEVICE WITH SPACER BETWEEN TWO SUBSTRATES

(75) Inventors: Yu-Kwan Kim, Incheon (KR); Junghan Shin, Yongin-si (KR); Jae Byung Park, Seoul (KR)

(73) Assignee: Samsung Display Co., Ltd. (KR)

( * ) Notice: Subject to any disclaimer, the term of this patent is extended or adjusted under 35 U.S.C. 154(b) by 324 days.

(21) Appl. No.: 13/207,364

(22) Filed: Aug. 10, 2011

(65) Prior Publication Data

US 2012/0153309 A1 Jun. 21, 2012

(30) Foreign Application Priority Data

Dec. 16, 2010 (KR) .................. 10-2010-0129240

(51) Int. Cl.
*H01L 33/00* (2010.01)
*H01L 21/00* (2006.01)
*G02B 26/10* (2006.01)

(52) U.S. Cl.
USPC ............. 257/88; 257/98; 257/435; 257/437; 438/29; 359/224.1; 359/233; 359/454

(58) Field of Classification Search
None
See application file for complete search history.

(56) References Cited

U.S. PATENT DOCUMENTS

| | | | |
|---|---|---|---|
| 2005/0017255 A1* | 1/2005 | Yamazaki | 257/84 |
| 2011/0032246 A1* | 2/2011 | Hong et al. | 345/214 |
| 2011/0235147 A1* | 9/2011 | Lee et al. | 359/230 |

FOREIGN PATENT DOCUMENTS

| | | |
|---|---|---|
| KR | 1020070114161 A | 11/2007 |
| KR | 1020100056734 A | 5/2010 |

* cited by examiner

*Primary Examiner* — Alonzo Chambliss
(74) *Attorney, Agent, or Firm* — Innovation Counsel LLP

(57) ABSTRACT

A display apparatus includes a first insulating substrate including a display area in which a first opening is formed, as well as a non-display area. A second insulating substrate faces the first insulating substrate. The second insulating substrate includes a shutter part having a second opening corresponding to the first opening. The shutter part moves between two different positions to transmit or block light according to an overlap between the first opening and the second opening.

13 Claims, 11 Drawing Sheets

DISPLAY DEVICE WITH SPACER BETWEEN TWO SUBSTRATES

CROSS-REFERENCE TO RELATED APPLICATION

This application claims priority to, and the benefit of, Korean Patent Application No. 10-2010-0129240 filed on Dec. 16, 2010, the contents of which are herein incorporated by reference in their entirety.

BACKGROUND

1. Field of Disclosure

Embodiments of the present invention relate generally to display technology. More particularly, embodiments of the present invention relate to a display apparatus having a microshutter and a method of manufacturing the display apparatus.

2. Description of the Related Art

Some recent display apparatuses, such as liquid crystal displays (LCDs), plasma display panels (PDPs), organic light emitting displays (OLEDs), field effect displays (FEDs), electrophoretic displays (EPDs), employ microelectromechanical system (MEMS) displays. These MEMS displays often use a microshutter with relatively high light efficiency and high speed switching capability. Light is transmitted through, or blocked by, the display according to the operation of the microshutter. This allows the MEMS display to have relatively high response speed with low driving voltage.

SUMMARY

Exemplary embodiments of the present invention provide a display apparatus capable of preventing defects caused by static electricity.

Exemplary embodiments of the present invention also provide a method of manufacturing this display apparatus.

According to exemplary embodiments, a display apparatus includes a first substrate and a second substrate facing the first substrate.

The first substrate includes a first insulating substrate, a spacer, a contact spacer, a conductive light-reflecting layer, and a light-absorbing layer.

The first insulating substrate includes a display area and a non-display area positioned outside the display area. The spacer is disposed on the first insulating substrate to maintain a distance between the first insulating substrate and the second insulating substrate. The contact spacer is disposed in the non-display area. The conductive light-reflecting layer covers the spacer and the contact spacer. The light-absorbing layer covers the conductive light-reflecting layer and exposes the conductive light-reflecting layer in areas corresponding to an upper surface of the spacer and an upper surface of the contact spacer. The conductive light reflecting layer and the light absorbing layer have a first opening to transmit a light.

The second substrate includes a second insulating substrate, a shutter part, and a ground wire. The second insulating substrate faces the first insulating substrate. The shutter part is provided on the second insulating substrate. The shutter part has a second opening corresponding to the first opening. The shutter part is movable so as to transmit or block the light according to an overlap between the first opening and the second opening. The ground wire is provided on the second insulating substrate to contact the exposed conductive light-reflecting layer.

According to other exemplary embodiments, a method of manufacturing a display apparatus is provided as follows. A first insulating substrate including a first display area a first non-display area and a second insulating substrate including a second display area corresponding to the first display area and a second non-display area corresponding to the first non-display area is received. A spacer is formed in the first display area and a contact spacer is formed in the first non-display area using a first mask. A conductive light-reflecting layer is formed to cover the spacer and the contact spacer. A light-absorbing layer is formed to cover the conductive light-reflecting layer and expose the conductive light-reflecting layer in areas corresponding to an upper surface of the spacer and an upper surface of the contact spacer. A portion of the conductive light-reflecting layer and the light-absorbing layer is removed in the first display area using a second mask, so as to form a first opening. A shutter part having a second opening is formed and the shutter part moves between two different positions. A ground wire is formed in the second display area. The first insulating substrate is coupled to the second insulating substrate such that the exposed conductive light-reflecting layer contacts the ground wire.

According to the above, the first substrate of the display apparatus may be manufactured using only two masks, thereby simplifying the manufacturing process and reducing manufacturing cost. In addition, static electricity generated in the first substrate is discharged to the exterior through the ground wire, thereby reducing the discharge of the static electricity inside the first substrate.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION

Figure 1:
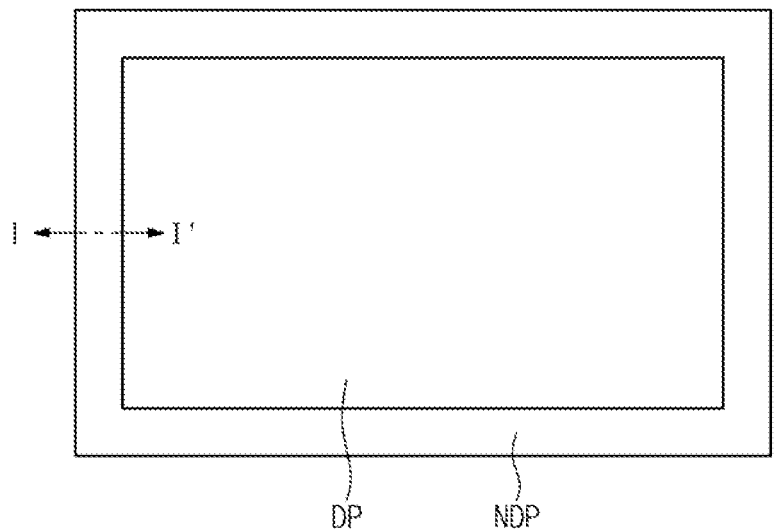
FIG. 1 is a plan view showing a display apparatus according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
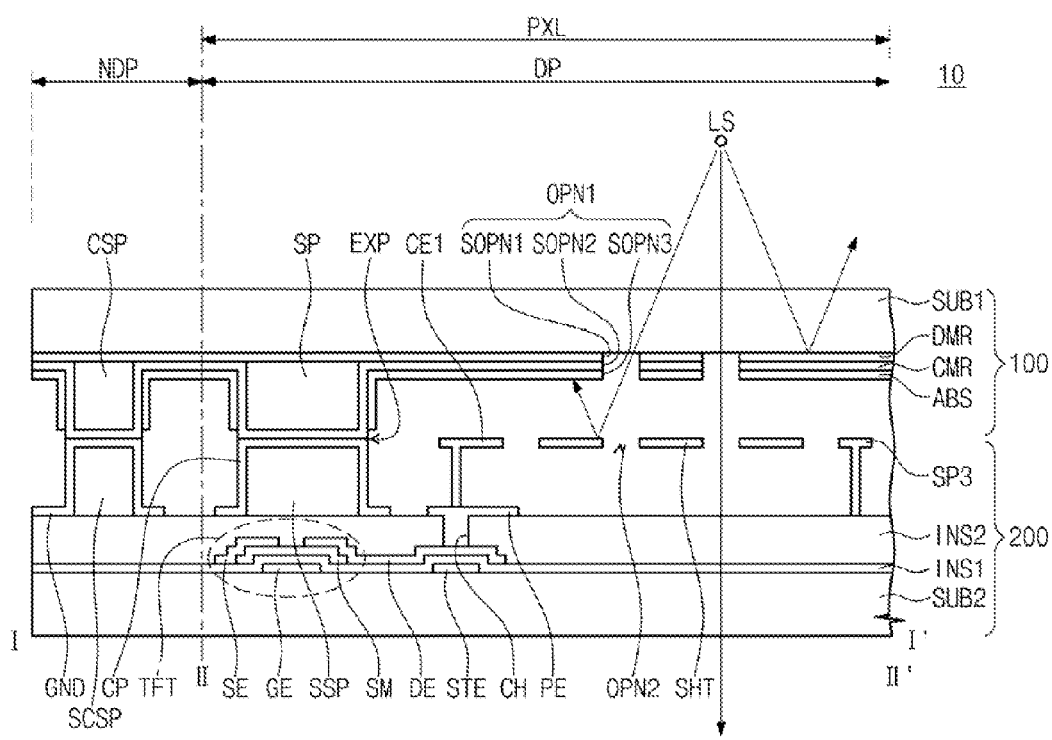
FIG. 2 is a cross-sectional view taken along a line I-I' of FIG. 1.
Figure 3:
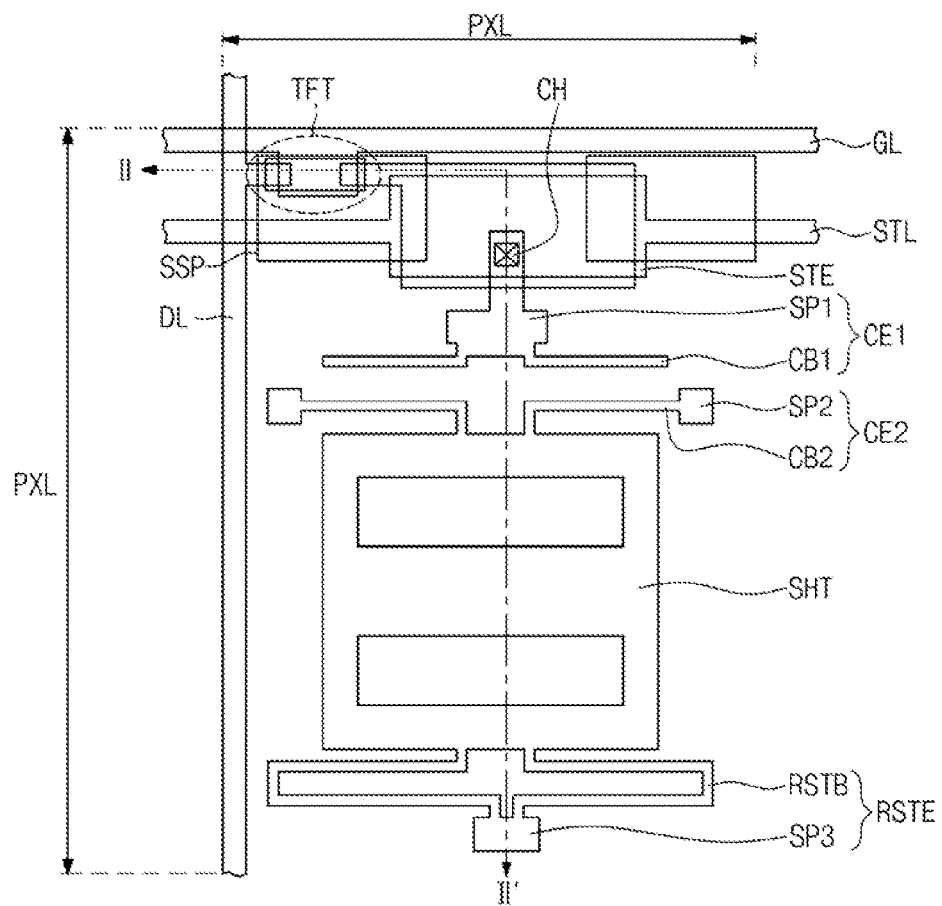
FIG. 3 is a plan view showing one pixel of the display apparatus of FIG. 1.

FIG. 1 is a plan view showing a display apparatus according to an exemplary embodiment of the present invention, FIG. 2 is a cross-sectional view taken along a line I-I' of FIG. 1, and FIG. 3 is a plan view showing one pixel of the display apparatus of FIG. 1. For convenience of explanation, one pixel PXL has been shown in FIGS. 2 and 3, but the display apparatus according to exemplary embodiments of the present invention may include a plurality of pixels PXL. The pixels PXL are arranged in a matrix shape and each generally has the same structure and function, and thus one pixel PXL will be described in detail as a representative example.

Referring to FIGS. 1 to 3, a display apparatus 10 includes a first substrate 100 and a second substrate 200 facing the first substrate 100. Each of the first and second substrates 100 and 200 includes a display area DP in which an image is displayed, and a non-display area NDP in which the image is not displayed. A plurality of first openings OPN1 is provided in the display area DP, to transmit light from outside the display apparatus. The non-display area NDP may be provided adjacent to one side of the display area DP, or provided to surround the display area DP. In the present exemplary embodiment, the non-display area NDP surrounds the display area DP.

Hereinafter, the first substrate 100 and the second substrate 200 will be described in further detail with reference to FIGS. 2 and 3.

The first substrate 100 includes a first insulating substrate SUB1, a dielectric light-reflecting layer DMR, a conductive light-reflecting layer CMR, a light-absorbing layer ABS, a spacer SP, and a contact spacer CSP.

The first insulating substrate SUB1 is formed of a transparent insulating material, such as glass, plastic, or crystal.

The dielectric light-reflecting layer DMR is disposed on one surface of the first insulating substrate SUB1, which is opposed to one surface of the second substrate SUB2, to reflect the light from outside the display apparatus, for example, light emitted from a light source LS. As shown in FIG. 2, the light source LS may be opposed to and spaced apart from the second substrate 100 while interposing the first substrate 100 therebetween.

The dielectric light-reflecting layer DMR may include two or more dielectric layers, and serve as a dielectric mirror. The dielectric layers include at least two dielectric materials having refractive indexes that are different from each other, and two adjacent dielectric layers have refractive indexes that are different from each other. For instance, the dielectric light-reflecting layer DMR may include a silicon oxide layer and a titanium oxide layer having different refractive indexes, and the silicon oxide layer and the titanium oxide layer may be alternately stacked one on another. The dielectric light-reflecting layer DMR reflects the light which is emitted from the light source LS and heads for the second substrate 200.

The spacer SP maintains a distance between the first substrate 100 and the second substrate 200, and protrudes from the dielectric light-reflecting layer DMR to a second insulating substrate SUB2. The spacer SP may be provided in both the display area DP and the non-display area NDP, and one or more may be provided in each pixel PXL. In each pixel PXL, the spacer SP is generally provided in an area away from the first opening OPN1, so that the spacers SP do not block (or do not substantially block) light passing through the first opening OPN1. In an exemplary embodiment of the present invention, one spacer SP may be provided in a plurality of pixels PXL.

The contact spacer CSP is disposed on the dielectric light-reflecting layer DMR in the non-display area NDP, to maintain the distance between the first substrate 100 and the second substrate 200 and to electrically connect the conductive light-reflecting layer CMR to a ground wire GND. Here, the contact spacer CSP is formed of the same insulating material as the spacer SP, such as an insulative organic polymer or an inorganic insulating material.

The conductive light-reflecting layer CMR is disposed on the first insulating substrate SUB1 to cover the spacer SP and the contact spacer CSP. The conductive light-reflecting layer CMR and dielectric light-reflecting layer DMR reflect light emitted from the light source LS. The conductive light-reflecting layer CMR also discharges static electricity from the pixels PXL through the ground wire GND. The conductive light-reflecting layer CMR may include a metal material having a relatively high light reflectance, such as aluminum.

The light-absorbing layer ABS is disposed on the conductive light-reflecting layer CMR to absorb light reflected by elements of the display apparatus 10. The light-absorbing layer ABS may include various materials to absorb light, such as a mixture of chromium (Cr) and chromium oxide (CrOx).

The light-absorbing layer ABS includes exposure holes EXP corresponding to the upper surface of the spacer SP and the upper surface of the contact spacer CSP. That is, the light-absorbing layer ABS is not formed on the upper surface of the spacer SP or the upper surface of the contact spacer CSP (i.e., is not formed on those surfaces of spacers SP, CSP that face each other). This is because the conductive light-reflecting layer CMR having a relatively high electric conductivity is directly connected to the ground wire GND on a second insulating substrate SUB2, resulting in discharging static electricity generated in the first substrate 100 and preventing circuits in the display apparatus form being damaged by static discharge.

One or more first openings OPN1 is provided in each pixel PXL. The first opening OPN1 provides an optical path through which the light passes. In the present exemplary embodiment, two first openings OPN1 are provided in each pixel PXL, but the invention should not be limited thereto or thereby. The first opening OPN1 is formed through the dielectric light-reflecting layer DMR, the conductive light-reflecting layer CMR, and the light-absorbing layer ABS. Namely, the dielectric light-reflecting layer DMR has a first sub-opening SOPN1, the conductive light reflecting layer CMR has a second sub-opening SOPN2, the light absorbing layer ABS has a third sub-opening SOPN3, and the first to third sub-openings SOPN1, SOPN2, and SOPN3 constitute the first opening OPN1.

Although not shown in FIGS. 1 and 3, a sealant is provided between the first substrate 100 and the second substrate 200 to create a seal between the first substrate 100 and the second substrate 200. When viewed in a plan view, the sealant is formed along an end (i.e. along the outer edge) of the first substrate 100.

The second substrate 200 includes the second insulating substrate SUB2, a shutter part, a supporter SSP, a contact supporter SCSP, and the ground wire GND.

The second insulating substrate SUB2 may be formed of a transparent insulating material, such as glass, plastic, or crystal, similar to the first insulating substrate SUB1.

The shutter part is disposed on the second insulating substrate SUB2, and moves so as to either transmit or block the light. The shutter part includes a switching device, a first flexible electrode CE1, a second flexible electrode CE2, a shutter SHT, and a restoration electrode RSTE.

The switching device is disposed on the second insulating substrate SUB2, to switch the shutter SHT according to the image signal. To this end, the switching device includes a gate line GL, a data line DL, a thin film transistor TFT, and a storage electrode STE.

The gate line GL extends generally in a particular direction on the second insulating substrate SUB2, and the data line DL is formed to cross the gate line GL with the first insulating layer INS1 interposed therebetween. The thin film transistor TFT may be formed adjacent to an area in which the gate line GL crosses the data line DL.

The thin film transistor TFT includes a gate electrode GE branched from the gate line GL, a source electrode SE branched from the data line DL, and a drain electrode DE disposed on the first insulating layer INS1 and spaced apart from the source electrode SE. A second insulating layer INS2 is disposed on the second insulating substrate SUB2 over the source electrode SE and the drain electrode DE. The second insulating layer INS2 includes a contact hole CH to expose a portion of an upper surface of the drain electrode DE, and the pixel electrode PE is electrically connected to the drain electrode DE through the contact hole CH.

The storage electrode STE is provided on the layer on which the gate electrode GE is provided, and overlaps the drain electrode DE. The storage electrode STE is connected to a storage line STL that is formed substantially parallel to the gate line GL. The storage electrode STE forms a capacitor with the drain electrode DE and first insulating layer INS1 interposed therebetween. In an exemplary embodiment of the present invention, the storage electrode STE may overlap the pixel electrode PE to form a capacitor with the pixel electrode PE.

The first flexible electrode CE1 and the second flexible electrode CE2 are spaced apart from each other. The first flexible electrode CE1 is disposed on the second insulating layer INS2 and electrically connected to the switching device. In detail, the first flexible electrode CE1 is connected to the pixel electrode PE, and the pixel electrode PE is electrically connected to the drain electrode DE of the switching device through the contact hole CH. The second flexible electrode CE2 faces the first flexible electrode CE1 to be spaced apart from the first flexible electrode CE1, and is connected to the shutter SHT.

The first flexible electrode CE1 includes a first flexible beam CB1 having elasticity, and a first supporter SP1 to fix the first flexible beam CB1 onto the second insulating layer INS2. The second flexible electrode CE2 includes a second flexible beam CB2 having elasticity and being connected to the shutter SHT, and a second supporter SP2 to affix the second flexible beam CB2 to the second insulating layer INS2.

The shutter SHT has a generally plate-like shape. The shutter SHT is disposed substantially parallel to the second insulating substrate SUB2, and one end thereof is connected to the second flexible electrode CE2. The shutter SHT includes an opaque material to block light. The shutter SHT also includes one or more second openings OPN2, and the second openings OPN2 have generally the same shape and size as those of the first opening OPN1. In addition, the second openings OPN2 are present in the same number as that of the first openings OPN1. In the present exemplary embodiment, two second openings OPN2 are provided and each has generally the same size. However, the invention also includes embodiments in which the first openings OPN1 may have different sizes from each other and may be provided in a different number as the second openings OPN2. For instance, in the case that there are two of each of the first and second openings OPN1 and OPN2, one of each of the first and second openings OPN1 and OPN2 may have a relatively larger size compared to the other. The shutter SHT moves in a direction substantially parallel to the second insulating substrate SUB2 by electrical attraction between the first and second flexible electrode CE1 and CE2 according to voltages applied to the first flexible electrodes CE1. Since the overlap between the first opening OPN1 and the second opening OPN2 is controlled by the movement of the shutter SHT, the light from the exterior transmits through the first and second openings OPN1 and OPN2 or is blocked by the shutter SHT, thereby displaying a black and white gray scale image.

The restoration electrode RSTE faces the second flexible electrode CE2 with the shutter SHT interposed therebetween, and is connected to the other end of the shutter SHT. The restoration electrode RSTE is connected to the shutter SHT, and includes a restoration beam RSTB having a beam shape and a third supporter SP3 to affix the restoration beam RSTB to the second insulating layer INS2. The restoration beam RSTB has elasticity, and provides a restoring force to the shutter SHT to allow the shutter SHT to return to its original position when a voltage is no longer applied to electrodes CE1. The third supporter SP3 stably fixes the shutter SHT and the restoration beam RSTB to the second insulating substrate SUB2.

The supporter SSP is disposed on the second insulating layer INS2 of the second insulating substrate SUB2 to correspond to the spacer SP. The supporter SSP protrudes from the second insulating layer INS2 to the first insulating substrate SUB1, to maintain the distance between the first substrate 100 and the second substrate 200 together with the spacer SP. A supporter SSP may be provided corresponding to each area in which the spacer SP is formed. A cover pattern CP is disposed on the supporter SSP to substantially cover the supporter SSP.

The contact supporter SCSP is disposed on the second insulating layer INS2 of the second insulating substrate SUB2 to correspond to the contact spacer CSP. The contact supporter SCSP maintains the distance between the first substrate 100 and the second substrate 200 together with the contact spacer CSP, and protrudes from the second substrate SUB2 to make the conductive light-reflecting layer CMR contact the ground wire GND. The contact supporter SCSP may be formed of the same material as the supporter SSP (although each can also be independently made of any suitable material), such as an insulative organic polymer or an inorganic insulating material.

The ground wire GND covers the contact supporter SCSP, and is formed of a conductive material. The ground wire GND may be formed of the same material as, and disposed on the same layer as, the cover pattern CP, the first and second flexible electrodes CE1 and CE2, the shutter SHT, and the restoration electrode RSTE. Each of the ground wire GND, the cover pattern CP, the first and second flexible electrodes CE1 and CE2, the shutter SHT, and the restoration electrode RSTE may separately or together have a single-layer structure or a double-layer structure. For instance, each of the ground wire GND, the cover pattern CP, the first and second flexible electrodes CE1 and CE2, the shutter SHT, and the restoration electrode RSTE may have a double-layer structure of an amorphous silicon layer doped with N or P-type impurity ions, and a metal layer formed on the amorphous silicon layer. The metal layer may be formed of various metals, such as aluminum (Al), copper (Cu), molybdenum (Mo), tungsten (W), chromium (Cr), or the like.

The ground wire GND directly contacts the conductive light-reflecting layer CMR of the first substrate 100. Although not shown in FIG. 2, the ground wire GND is connected to an external ground. Accordingly, the static electricity generated in the first substrate 100 is discharged to the exterior through the ground wire GND, thereby reducing the buildup of static electricity inside the first substrate 100. In detail, although static electricity is generated in the first substrate 100, circuits in the display apparatus may be prevented from being damaged by discharge of this static electricity, as the ground wire GND is connected to the conductive light-reflecting layer CMR and the static electricity is discharged to the exterior through the ground wire GND. That is, static electricity generated in first substrate 100 is discharged through conductive light-reflecting layer CMR and ground wire GND, which are connected to each other, thus preventing circuits in the display apparatus from being damaged by static discharge.

In the present exemplary embodiment, the supporter SSP and the contact supporter SCSP support the spacer SP and the contact spacer CSP, respectively. However, the invention is not limited thereto. That is, the supporter SSP and the contact supporter SSP may be removed from the display apparatus, or may have variable heights. For example, when the spacer SP and the contact spacer CSP have a height sufficient to provide space for the shutter SHT to actuate, the supporter SSP and the contact supporter SCSP may not be necessary, and may be removed from the display apparatus. In the case that the supporter SSP and the contact supporter SCSP are removed, the ground wire GND may be disposed on the second insulating layer INS2 to contact the conductive light-reflecting layer CMR on the supporter SSP.

In the display apparatus 10 having the above-mentioned structure, the light source LS may be disposed above the first insulating substrate SUB1 to face the second insulating substrate SUB2. The light source LS directs at least some light toward the first and second openings OPN1 and OPN2.

In operation, when no voltage is applied to the first flexible electrode CE1, the first flexible electrode CE1 is spaced apart from the second flexible electrode CE2. In this case, since the first opening OPN1 overlaps the second opening OPN2, the shutter SHT is maintained in an open state. Thus, the light passes through the first opening OPN1 and the second opening OPN2 to be applied to the pixels, so that the pixels display a white color (or the color of light source LS, if not white).

When a voltage is applied to the first flexible electrode CE1 through the thin film transistor TFT, the second flexible electrode CE2 makes contact with the first flexible electrode CE1 due to electrostatic attraction. As a result, the shutter SHT moves toward the first flexible electrode CE1 from its original position. When the shutter SHT moves a sufficient distance, the first opening OPN1 no longer overlaps with the second opening OPN2 and the light passing through the first opening OPN1 is blocked by the shutter SHT, so that the pixels display a black color.

Accordingly, the display apparatus 10 may prevent the circuits therein from being damaged by the static electricity. In addition, since the spacer SP is formed outside the area of the first and second openings OPN1 and OPN2, of the presence of spacer SP does not reduce the aperture ratio of the display apparatus 10. Further, the conductive light-reflecting layer CMR disposed on the spacer CP reflects the light traveling toward the spacer SP, to thereby reduce loss or leakage of the light.

Hereinafter, a method of manufacturing the display apparatus 10 will be described in detail. In the present exemplary embodiment, for the convenience of explanation, the method of manufacturing the first substrate 100 will be described, and then the method of manufacturing the second substrate 200 will be described.

FIGS. 4A to 4F are cross-sectional views showing a method of manufacturing the first substrate 100.

Figure 4A:
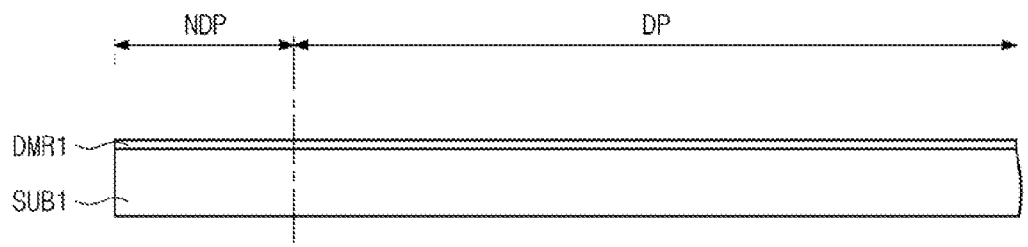
FIGS. 4A to 4F are cross-sectional views showing a method of manufacturing a first substrate.

As shown in FIG. 4A, when the first insulating substrate SUB1 is prepared, a preliminary dielectric light-reflecting layer DMR1 is formed on the first insulating substrate SUB1.

The preliminary dielectric light-reflecting layer DMR1 is formed by stacking two or more dielectric layers one on another, where adjacent dielectric layers have different refractive indexes. Thus, the dielectric layers may serve as a dielectric mirror. Although not shown in figures, the dielectric layers may be formed by alternately stacking a silicon oxide (SiO2) layer and a titanium oxide (TiO2) layer. For instance, for a dielectric mirror that reflects light having components in the red, green, and blue wavelength ranges, a titanium oxide layer of about 120 nm to about 135 nm thickness, a silicon oxide layer of about 80 nm to about 95 nm thickness, a titanium oxide of about 60 nm to about 70 nm thickness, a silicon oxide of about 80 nm to about 95 nm thickness, a titanium oxide of about 55 nm to about 70 nm thickness, and a silicon oxide of about 80 nm to about 95 nm thickness are sequentially stacked or formed.

Figure 4B:
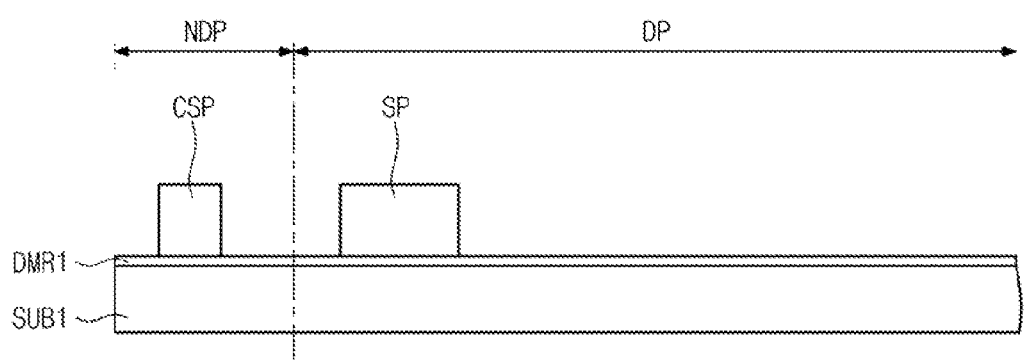

Then, as shown in FIG. 4B, through a photolithography process using a first mask, the spacer SP may be formed in the display area DP and/or the non-display area NDP, and the contact spacer CSP may be formed in the non-display area NDP. The spacer SP and the contact spacer CSP may be formed of an insulative organic polymer or an inorganic insulating material.

Figure 4C:
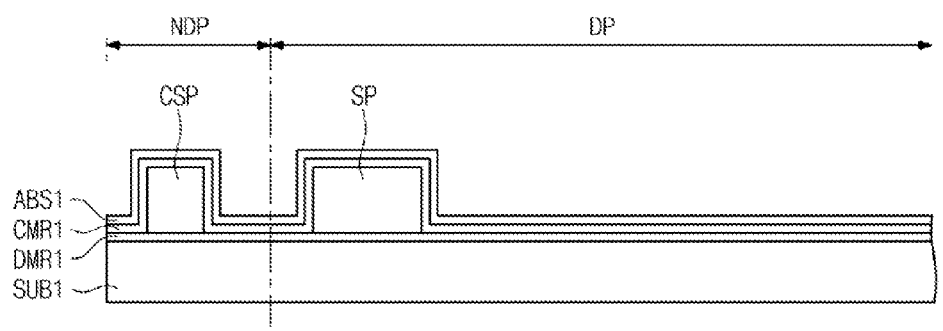

Referring to FIG. 4C, a preliminary conductive light-reflecting layer CMR1 using a conductive material and a preliminary light-absorbing layer ABS1 using a light-absorbing material are sequentially formed on the first insulating substrate SUB1 over the spacer SP and the contact spacer CSP. The conductive material may include aluminum, and the preliminary light-absorbing layer ABS1 may include a mixture of chromium (Cr) and chromium oxide (CrOx).

Figure 4D:
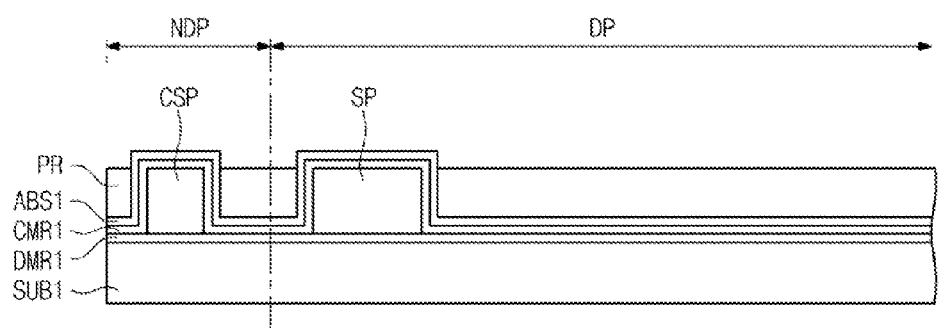

Then, as shown in FIG. 4D, a photoresist PR is coated on the first insulating substrate SUB1 over the preliminary light-absorbing layer ABS1. Since the spacer SP and the contact spacer CSP each protrude from the surface of the preliminary dielectric light-reflecting layer DMR1, the photoresist PR may be formed to cover the upper surface of the preliminary light-absorbing layer CMR1 in areas in which the spacer SP and the contact spacer CSP are not formed, and to expose the upper surface of the preliminary light-absorbing layer CMR1 in areas where the spacer SP and the contact spacer CSP are formed.

Figure 4E:
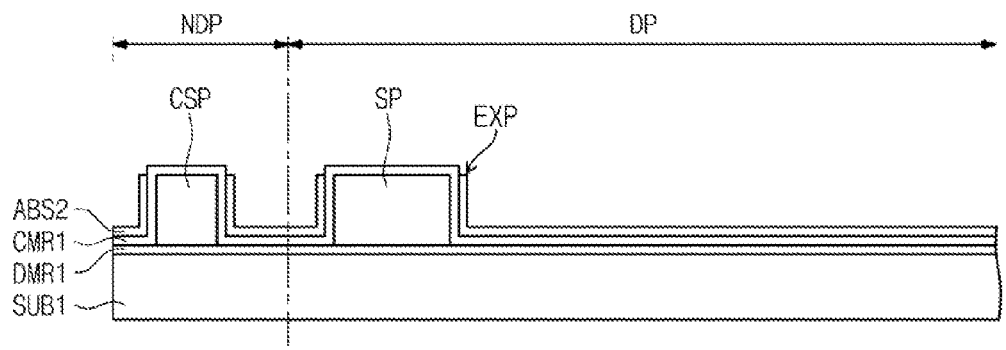

As shown in FIG. 4E, the preliminary light-absorbing layer ABS1 is etched using the photoresist PR as a mask to form a light-absorbing layer pattern ABS2, and then the photoresist PR is removed. Accordingly, the light-absorbing layer pattern ABS2 may be provided with exposure holes EXP to expose the preliminary conductive light-reflecting layer CMR1 in the areas corresponding to the spacer SP and the contact spacer CSP.

Figure 4F:
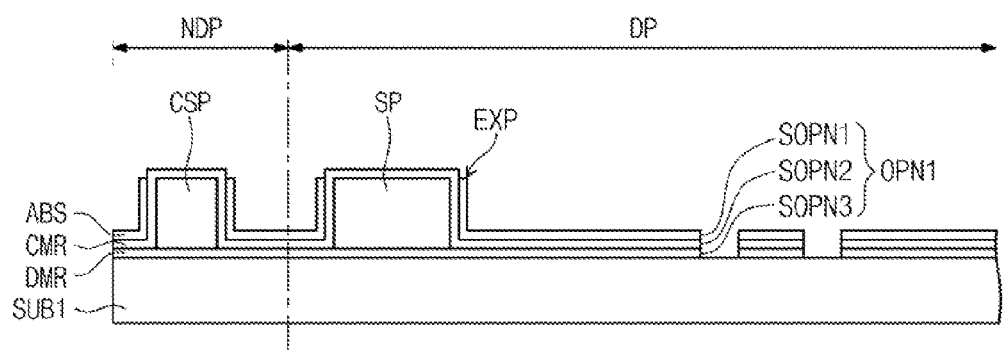

Referring to FIG. 4F, the preliminary dielectric light-reflecting layer DMR1, the preliminary conductive light-reflecting layer CMR1, and the light-absorbing layer pattern ABS2 are partially etched through a photolithography process using a second mask to form the dielectric light-reflecting layer DMR, the conductive light-reflecting layer CMR, and the light-absorbing layer ABS. This process also forms the first openings OPN1.

As described above, the parts included in the display area DP and the non-display area NDP of the first substrate 100 may be formed using two masks. This includes formation of the contact spacer CSP.

FIGS. 5A to 5I are cross-sectional views showing a method of manufacturing a second substrate.

Figure 5A:
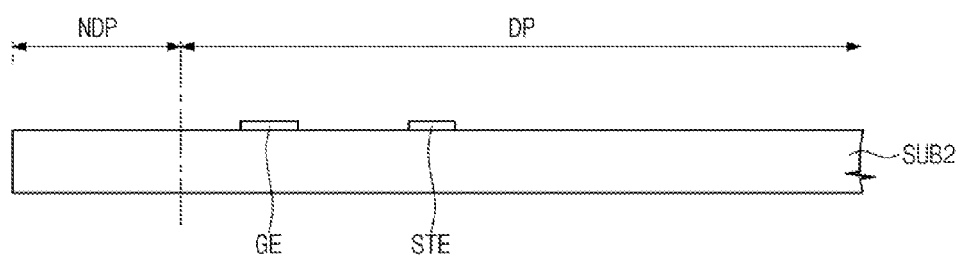
FIGS. 5A to 5I are cross-sectional views showing a method of manufacturing a second substrate.

Referring to FIG. 5A, the second insulating substrate SUB2 is prepared. Then, a conductive material is deposited on substantially the entire surface of the second insulating substrate SUB2 and is patterned using a photolithography process, so as to form the gate line GL, the gate electrode GE, the storage line STL, and the storage electrode STE. The conductive material may include a metal material such as copper, molybdenum, aluminum, tungsten, chromium, etc. The gate line GL, the gate electrode GE, the storage line STL, and the storage electrode STE may be formed as a single layer, a multiple layer, or an alloy layer. For instance, the gate line GL, the gate electrode GE, the storage line STL, and the storage electrode STE may have a triple layer of molybdenum-aluminum-molybdenum (Mo—Al—Mo) or an alloy layer of molybdenum-aluminum.

Figure 5B:
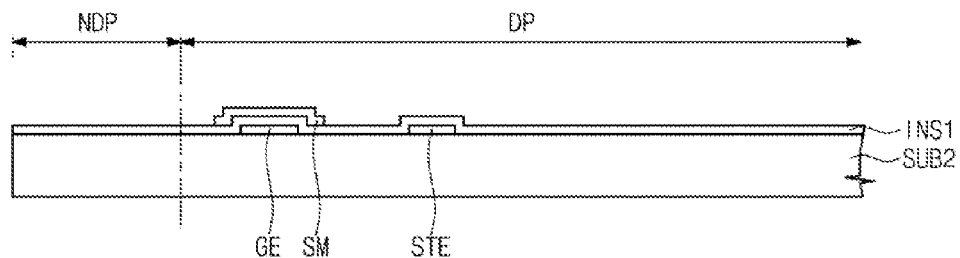

Then, as shown in FIG. 5B, the first insulating layer INS1 is formed on the second insulating substrate SUB2, and the semiconductor pattern SM is formed on the first insulating layer INS1 at a position corresponding to the gate electrode GE. The semiconductor pattern SM may include an active pattern (not shown) including silicon and an ohmic contact pattern (not shown) including n+ silicon doped with impurity ions. In detail, the semiconductor pattern SM may be formed by forming a silicon layer, doping impurity ions into the surface portion of the silicon layer, and patterning the silicon layer and the doped surface portion by using a photolithography process.

Figure 5C:
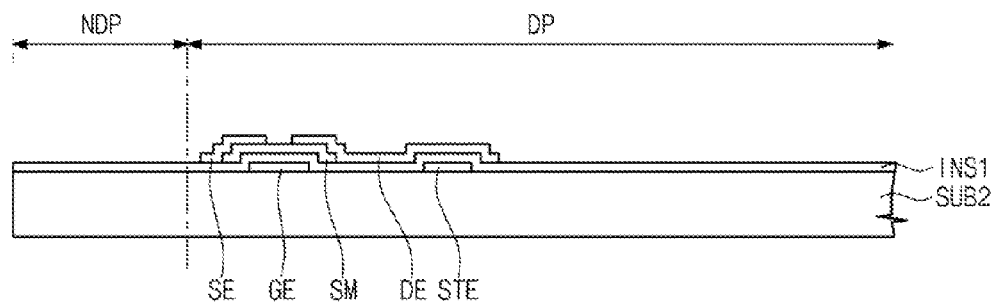

Referring to FIG. 5C, a conductive material is then deposited on substantially the entire surface of the second insulating substrate SUB2. Then, the conductive material is patterned using a photolithography process to form the data line DL, the source electrode SE, and the drain electrode DE. The conductive material may include a metal material such as copper, molybdenum, aluminum, tungsten, chromium, etc. The data line DL, the source electrode SE, and the drain electrode DE may be formed as a single layer, a multiple layer, or an alloy layer. For instance, the data line DL, the source electrode SE, and the drain electrode DE may have a triple layer of molybdenum-aluminum-molybdenum (Mo—Al—Mo) or an alloy layer of molybdenum-aluminum. Although not shown in FIG. 5C, an additional ohmic contact pattern can be formed on the active layer under the source electrode SE and, separately, under the drain electrode DE.

Figure 5D:
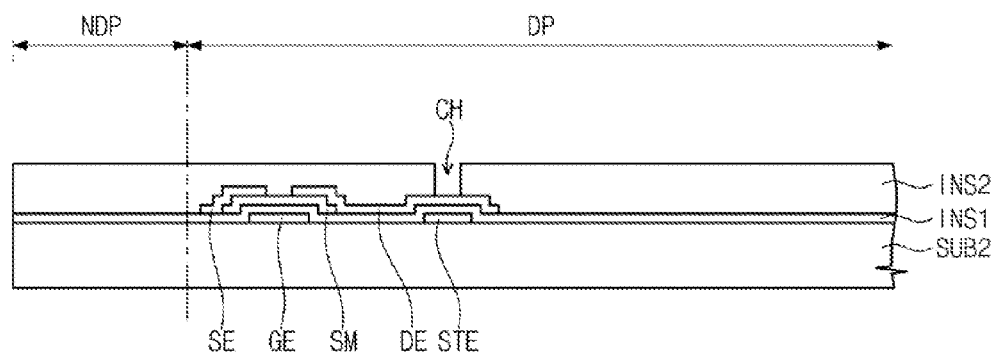

After that, as shown in FIG. 5D, the second insulating layer INS2 is formed on the second insulating substrate SUB2 and is patterned using a photolithography process to expose a portion of the drain electrode DE through the contact hole CH.

Figure 5E:
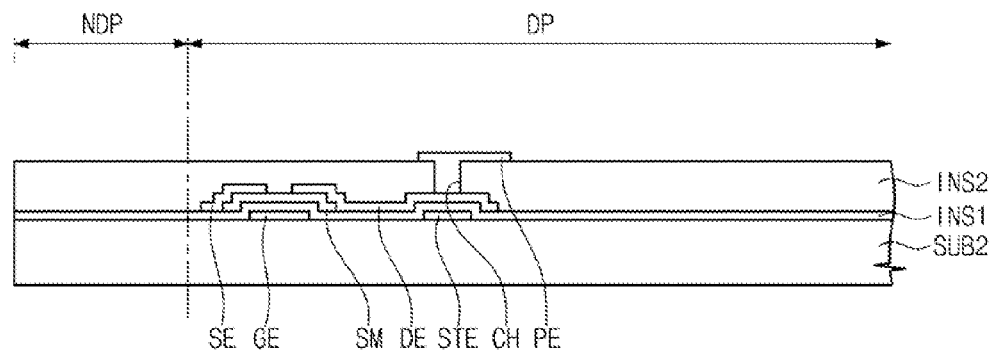

Then, as shown in FIG. 5E, a conductive material is formed on the second insulating layer INS2 and is patterned using a photolithography process, thereby forming the pixel electrode PE which is connected to the drain electrode DE through the contact hole CH.

Figure 5F:
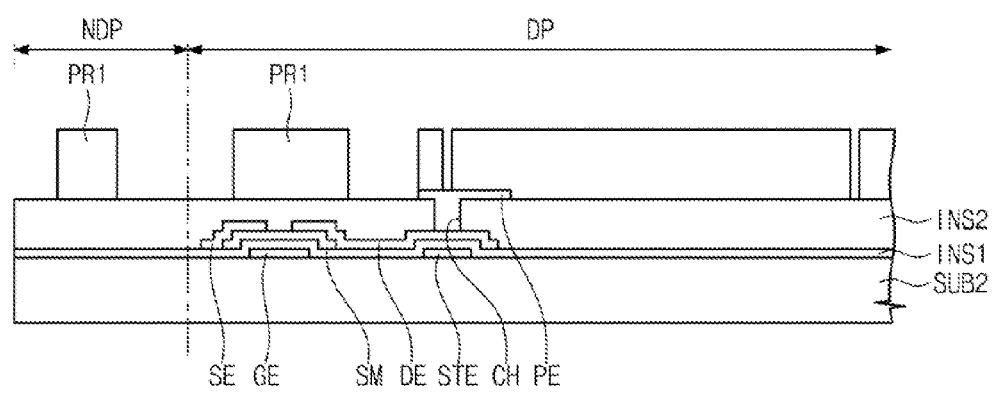

Referring to FIG. 5F, a photoresist is coated on the second insulating substrate SUB2, and patterned to form a photoresist pattern PR1. The photoresist pattern PR1 may include organic insulating material, and may have a multi-layer structure. In addition, in the case that the photoresist pattern PR1 has a double-layer structure, the lower layer may have a different shape from that of the upper layer. The shape of the photoresist pattern PR1 may vary depending upon the shapes of the first and second flexible electrodes CE1 and CE2, the shutter SHT, and the restoration electrode RSTE.

The photoresist pattern PR1 is formed in areas generally corresponding to where the supporter SSP, the contact supporter SCSP, the first and second flexible electrodes CE1 and CE2, the shutter SHT, and the restoration electrode RSTE are to be formed.

Figure 5G:
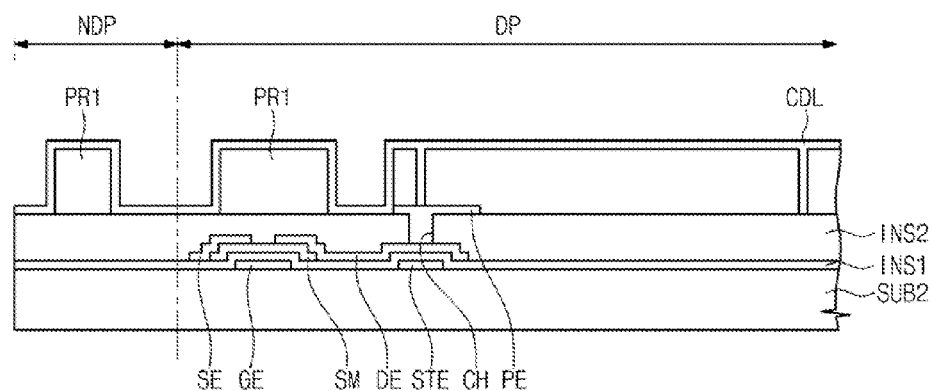

Then, as shown in FIG. 5G, a preliminary conductive layer CDL is formed on the second insulating substrate SUB2, using a conductive material. The preliminary conductive layer CDL may have a single-layer structure or a multi-layer structure. For instance, the preliminary conductive layer CDL may include a silicon layer doped with N or P-type impurity ions, and a metal layer formed on the silicon layer. The metal layer may be aluminum, copper, molybdenum, tungsten, chromium, etc. The preliminary conductive layer CDL may have a relatively high electric conductivity, since the preliminary conductive layer CDL will be patterned to serve as the ground wire GND.

Figure 5H:
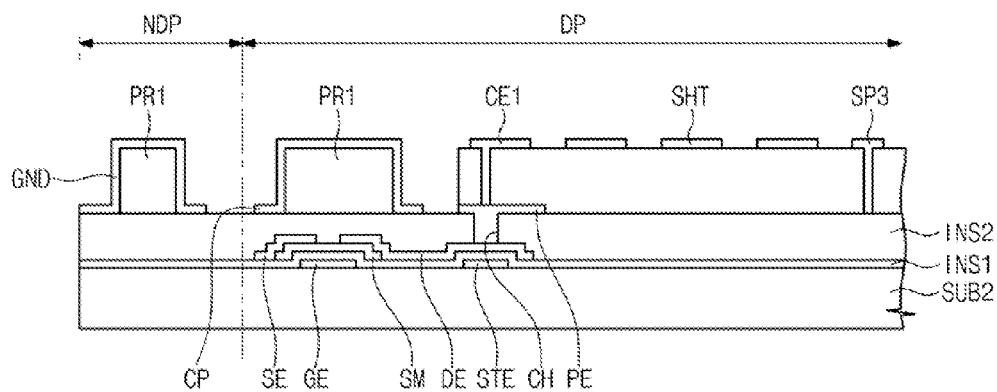

Referring to FIG. 5H, the preliminary conductive layer CDL is patterned using a photolithography process to form the ground wire GND, the cover pattern CP, the first and second flexible electrodes CE1 and CE2, the shutter SHT, and the restoration electrode RSTE. The portion of photoresist pattern PR1 corresponding to the supporter SSP is completely covered by the cover pattern CP, and the photoresist pattern PR1 corresponding to the contact supporter SCSP is completely covered by the ground wire GND. In addition, an upper surface or a side surface of the photoresist pattern PR1 is exposed in areas in which the first and second flexible electrodes CE1 and CE2, the shutter SHT, and the restoration electrode RSTE are formed.

Figure 5I:
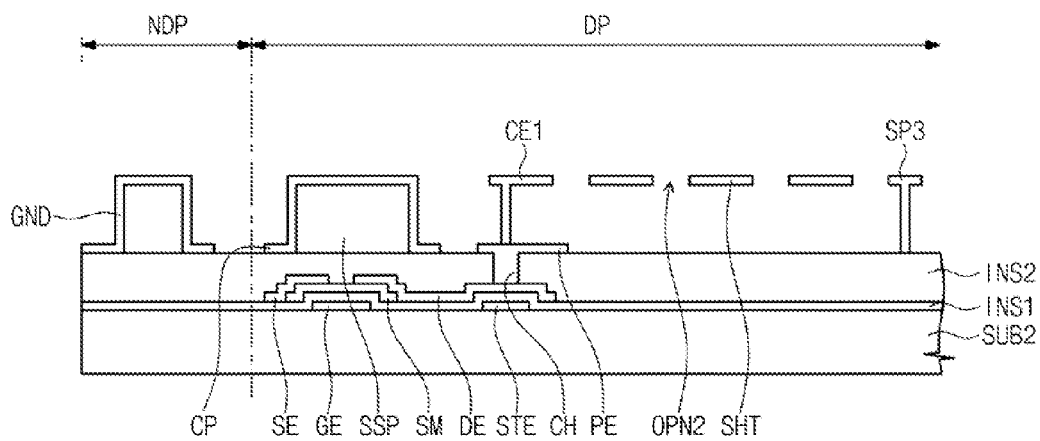

Then, as shown in FIG. 5I, the supporter SSP and the contact supporter SCSP are formed, and the remainder of the photoresist pattern PR1, corresponding to the areas in which the first and second flexible electrodes CE1 and CE2, the shutter SHT, and the restoration electrode RSTE are formed, is removed. The photoresist pattern PR1 may be removed by an isotropic etching process such as a microwave oxygen ($O_2$) plasma process. When the photoresist pattern PR1 is etched by an isotropic etching process, the photoresist pattern PR1 in the areas corresponding to the supporter SSP and the contact supporter SCSP is not etched, since those portions of the photoresist pattern PR1 are covered by the ground wire GND and the cover pattern CP.

After that, although not shown in figures, the first substrate 100 is coupled with the second substrate 200, and thus the display apparatus 10 as shown in FIGS. 1 to 3 is completed. In addition, a sealant may be provided on an end portion of the first substrate 100 or the second substrate 200, to stably couple the first substrate 100 to the second substrate 200.

As described above, the contact spacer CSP is formed with the spacer SP, and the conductive light-reflecting layer CMR is formed on the spacer SP and the contact spacer CSP. This creates electrical contacts between the first substrate 100 and the second substrate 200. Additionally, the first substrate 100 of the display apparatus 10 may be manufactured using only two masks, thereby simplifying the manufacturing process and reducing manufacturing cost.

Furthermore, according to the exemplary embodiments, the switching device and the first and second flexible electrodes are positioned at one end of the shutter, but the invention should not be limited thereto or thereby. That is, additional switching devices and additional flexible electrodes may be connected to the other end of the shutter if desired.

Although exemplary embodiments of the present invention have been described, it is understood that the present invention should not be limited to these exemplary embodiments. Rather, various changes and modifications can be made by one ordinary skilled in the art within the spirit and scope of the present invention as hereinafter claimed.

What is claimed is:

1. A display apparatus comprising:
    a first insulating substrate comprising a display area and a non-display area positioned outside the display area;
    a second insulating substrate facing the first insulating substrate;
    a spacer disposed on the first insulating substrate to maintain a distance between the first insulating substrate and the second insulating substrate;
    a contact spacer disposed in the non-display area;
    a conductive light-reflecting layer that covers the spacer and the contact spacer;
    a light-absorbing layer that covers the conductive light-reflecting layer and exposes the conductive light-reflecting layer in areas corresponding to an upper surface of the spacer and an upper surface of the contact spacer;
    a shutter part provided on the second insulating substrate; and
    a ground wire provided on the second insulating substrate to contact the exposed conductive light-reflecting layer,
    wherein the conductive light reflecting layer and the light absorbing layer have a first opening to transmit a light, the shutter part has a second opening corresponding to the first opening, and the shutter part is movable so as to transmit or block the light according to an overlap between the first opening and the second opening.

2. The display apparatus of claim 1, further comprising a dielectric light-reflecting layer provided between the spacer and the first insulating substrate and between the contact spacer and the first insulating substrate, so as to cover the first insulating substrate.

3. The display apparatus of claim 2, the dielectric light-reflecting layer has a sub-opening which constitutes a part of the first opening.

4. The display apparatus of claim 2, wherein the dielectric light-reflecting layer comprises at least two dielectric layers, wherein two adjacent ones of the dielectric layers have different refractive indexes from each other.

5. The display apparatus of claim 4, wherein the dielectric layers comprise at least one silicon oxide layer and at least one titanium oxide layer, which are stacked in alternating manner.

6. The display apparatus of claim 1, wherein the conductive light-reflecting layer comprises a metal.

7. The display apparatus of claim 6, wherein the metal is aluminum.

8. The display apparatus of claim 1, further comprising:
    a supporter provided on the second insulating substrate to correspond to the spacer; and
    a contact supporter provided on the second insulating substrate to correspond to the contact spacer.

9. The display apparatus of claim 8, wherein the ground wire comprises a same material as the shutter part.

10. The display apparatus of claim 1, wherein the shutter part comprises:
    a switching device disposed on the second insulating substrate;
    a first flexible electrode disposed on the second insulating substrate and electrically connected to the switching device;
    a second flexible electrode facing the first flexible electrode; and
    a shutter connected to the second flexible electrode and including the second opening,
    wherein the first and second flexible electrodes move the shutter in response to a voltage applied to the first flexible electrode.

11. The display apparatus of claim 1, wherein the spacer comprises a same material as the contact spacer and is disposed on a same layer as the contact spacer.

12. The display apparatus of claim 1, wherein the spacer and the contact spacer are formed from a same layer.

13. The display apparatus of claim 1, further comprising a light source disposed to face the second insulating substrate while the first insulating substrate is positioned between the light source and the second insulating substrate, in order to provide the light to the first opening.

* * * * *